(12) United States Patent
Yasui et al.

(10) Patent No.: US 7,643,926 B2
(45) Date of Patent: Jan. 5, 2010

(54) ROLLING MOTION STABILITY CONTROL APPARATUS FOR A VEHICLE

(75) Inventors: Yoshiyuki Yasui, Nagoya (JP); Toshihisa Kato, Handa (JP); Hiroshi Matsuoka, Toyota (JP); Junya Nagaya, Kariya (JP)

(73) Assignee: Advics Co., Ltd., Kariya, Aichi Pref. (JP)

( * ) Notice: Subject to any disclaimer, the term of this patent is extended or adjusted under 35 U.S.C. 154(b) by 465 days.

(21) Appl. No.: 11/190,822

(22) Filed: Jul. 28, 2005

(65) Prior Publication Data
US 2006/0241828 A1  Oct. 26, 2006

(30) Foreign Application Priority Data
Apr. 21, 2005  (JP) .............................. 2005-124105

(51) Int. Cl.
*B60T 8/24* (2006.01)
*G06G 1/00* (2006.01)
(52) U.S. Cl. .............................. 701/72; 701/41; 701/48; 701/70; 701/71; 701/78; 701/79; 701/82; 701/83; 701/84
(58) Field of Classification Search ............. 701/36–38, 701/41, 45, 69–71, 74, 78, 82–84, 90–91, 701/124
See application file for complete search history.

(56) References Cited

U.S. PATENT DOCUMENTS

| | | | |
|---|---|---|---|
| 5,228,757 A * | 7/1993 | Ito et al. ...................... | 303/146 |
| 5,850,616 A * | 12/1998 | Matsuno et al. ............... | 701/82 |
| 6,086,168 A | 7/2000 | Rump | |
| 6,179,394 B1 * | 1/2001 | Browalski et al. ............ | 303/146 |
| 6,338,012 B2 * | 1/2002 | Brown et al. .................... | 701/1 |
| 6,438,463 B1 | 8/2002 | Tobaru et al. | |
| 6,494,281 B1 * | 12/2002 | Faye et al. .................. | 180/197 |
| 6,694,226 B2 | 2/2004 | Tobaru et al. | |
| 2002/0173882 A1 | 11/2002 | Tobaru et al. | |

FOREIGN PATENT DOCUMENTS

JP  2001-71787  3/2001

OTHER PUBLICATIONS

Masato Abe, "Vehicle Dynamics and Control", May 31, 1994, pp. 2-3 and 148-149, published by Sankaido Co. Ltd. (cited in the specification).

* cited by examiner

*Primary Examiner*—Khoi Tran
*Assistant Examiner*—Bhavesh V Amin
(74) *Attorney, Agent, or Firm*—Buchanan Ingersoll & Rooney PC

(57) ABSTRACT

A rolling motion stability control apparatus restrains a roll increasing tendency of a vehicle, with each wheel of the vehicle being braked by a wheel brake device. A first braking force control device is provided for applying a first braking force to the wheel, when the vehicle is turned to one direction. A second braking force control device is provided for applying a second braking force to the wheel, when the vehicle is turned to the other direction. References for starting controls of the first and second braking force control devices are set to be of predetermined values, respectively. The reference for starting the control of the second braking force control device is modified to be smaller than a predetermined value, when the vehicle is turned to the one direction.

7 Claims, 10 Drawing Sheets

| ROLL STATE VARIABLE (Rst) | OUTPUT (Rot) | STATE VARIABLE INDICATIVE OF MAGNITUDE (Ram) | · ROLL ANGLE (Ra) |
|---|---|---|---|
| | | | · SUSPENTION STROKE (STxx) |
| | | STATE VARIABLE INDICATIVE OF VELOCITY (Rsp) | · ROLL VELOCITY (Rr) |
| | | | · SUSPENSION STROKE VELOCITY (dSTxx) |
| | INPUT (Rin) | STATE VARIABLE INDICATIVE OF MAGNITUDE (ROLL INPUT MAGNITUDE) (Rm) | · STEERING WHEEL ANGLE ($\delta$sw) (→ESTIMATED LATERAL ACCELERATION (Gy2)) |
| | | | · WHEEL SLIP ANGLE ($\alpha$xx) |
| | | | · VEHICLE SLIP ANGLE ($\beta$) |
| | | | · YAW VELOCITY (Yr) (→ESTIMATED LATERAL ACCELERATION (Gy1)) |
| | | | · LATERAL ACCELERATION (Gy) |
| | | | · WHEEL LATERAL FORCE (SFxx) |
| | | | · INERTIA FORCE (Fy) |
| | | | · ROLLING MOMENT (Mx) |
| | | | · YAWING MOMENT (Ym) |
| | | STATE VARIABLE INDICATIVE OF VELOCITY (ROLL INPUT VELOCITY) (dRm) | · STEERING WHEEL ANGULAR VELOCITY (d$\delta$sw) (→VARIATION OF ESTIMATED LATERAL ACCELERATION (dGy2)) |
| | | | · WHEEL SLIP VELOCITY (d$\alpha$xx) |
| | | | · VEHICLE SLIP VELOCITY (d$\beta$) |
| | | | · YAW ACCELERATION (dYr) (→VARIATION OF ESTIMATED LATERAL ACCELERATION (dGy1) |
| | | | · VARIATION OF LATERAL ACCELERATION (dGy) |
| | | | · VARIATION OF WHEEL LATERAL FORCE (dSFxx) |
| | | | · VARIATION OF INERTIA FORCE (dFy) |
| | | | · VARIATION OF ROLLING MOMENT (dMx) |
| | | | · VARIATION OF YAWING MOMENT (dYm) |

ROLLING MOTION STABILITY CONTROL APPARATUS FOR A VEHICLE

This application claims priority under 35 U.S.C. Sec. 119 to No. 2005-124105 filed in Japan on Apr. 21, 2005, the entire content of which is herein incorporated by reference.

BACKGROUND OF THE INVENTION

1. Field of the Invention

The present invention relates to a rolling motion stability control apparatus for a vehicle, particularly relates to an apparatus for restraining a roll increasing tendency of the vehicle to stabilize the rolling motion.

2. Description of the Related Arts

In order to maintain a stability of a vehicle, there is known heretofore an apparatus for controlling a braking force applied to each wheel by means of a braking system, as disclosed in the U.S. Pat. No. 6,086,168, for example. In the United States Patent, described is "For at least one vehicle-movement dynamics characteristic variable which is indicative of the tendency of the vehicle to tilt about the longitudinal axis, an associated tilting-prevention threshold value is prescribed. The respective characteristic-variable instantaneous value is acquired continuously and compared with the tilting-prevention threshold value. As soon as a characteristic-variable instantaneous value exceeds the associated tilting-prevention threshold value, the wheels which are on the outside during cornering are braked in order to prevent the vehicle tilting about the longitudinal axis of the vehicle." Also, it is described that the instantaneous values of vehicle-movement dynamics characteristic variables include variables such as the lateral acceleration, the change over time of the lateral acceleration, the attitude angle, the attitude-angle velocity, the change in the attitude-angle velocity over time and the slip angle. And, as a first embodiment of the method, it is proposed that the lateral acceleration is the only vehicle-movement dynamics characteristic variable. With respect to another embodiment, it is described that the lateral acceleration, the change in the lateral acceleration over time, the attitude angle, the attitude-angle velocity, the change in the attitude-angle velocity over time and the slip angle are used as vehicle-movement dynamics characteristic variables. And, it is described that if one or more characteristic variables exceed the associated threshold values, the vehicle-movement dynamics control system brakes the wheels which are on the outside during cornering, such that they are placed in a high slip state.

According to the method as described in the above United States Patent, it focused on a vehicle behavior during cornering, which is a motion about a longitudinal axis of the vehicle, to be classified as a rolling motion in view of a vehicle motion control, as described in a book entitled "Vehicle Dynamics and Control" written by Masato Abe, and published by Sankaido Co. Ltd., on May 31, 1994. On Page 3 of that book, the rolling motion has been classified as a motion which is basically created by a steering operation, together with a lateral motion of the vehicle, and a yawing motion about a vertical axis of the vehicle. And, it is described on Page 148 of the book that if a rolling moment acts on the vehicle, a roll angle will be caused about a roll center.

In general, the roll angle has been employed as a factor indicative of the rolling motion of the vehicle, as described above. With respect to the roll angle, in Japanese Patent Laid-open Publication No. 2001-71787 and its English abstract of esp@cenet database, disclosed is a method proposed to improve the accuracy of deciding whether a vehicle is liable to roll over or not from its roll angle and roll angular velocity. It is described in the English abstract that with threshold lines plotted on a two-dimensional map employing parameters, or a vehicle roll angle and roll angular velocity, the hysteresis of the actual roll angle and roll angular velocity of the vehicle, when crossing either the threshold line from a non roll over region including the origin to a roll over region delimited away from the origin, shows that the vehicle is liable to roll over. According to the method as proposed in the above Japanese Publication, it is provided with a roll angular velocity sensor, which outputs the roll angular velocity, the integrated value of which is employed as a variation of the roll angle, and added to an initial value of the roll angle calculated on the basis of the output of a lateral acceleration sensor, thereby to obtain the roll angle. Then, it is described that the result determined whether there is a possibility of roll over of the vehicle can be used for controls for inflating an inflatable curtain, inflating a side air bag, extending a retractable roll over, or the like.

The method as proposed in the above Japanese Publication is applied to apparatuses which are adapted to perform the control for inflating the inflatable curtain or the like, in response to the result of determination based on the roll angle and roll angular velocity. Therefore, it is required to be capable of determining that the rolling motion of the vehicle has been excessive, to such an extent that vehicle passengers must be protected by inflating the inflatable curtain. On the contrary, it is not appropriate to inflate the inflatable curtain in such a state that the rolling motion of the vehicle is not so large. In contrast, when the rolling motion is determined for the stability control of the vehicle in the rolling motion, it is required to detect a slight rolling motion. Therefore, the method as described in the above Japanese Publication can not be applied to the determination of the rolling motion for the stability control of the vehicle according to the present invention.

In the U.S. Patent as described before, it is described that a plurality of vehicle-movement dynamics characteristic variables such as the lateral acceleration, and explained is one embodiment that employs the lateral acceleration as the only dynamics characteristic variable, and the other one embodiment that employs one or more characteristic variables as the dynamics characteristic variables. With respect to the former embodiment, however, described is "as soon as the characteristic-variable instantaneous value exceeds the associated tilting-prevention threshold value", and with respect to the latter embodiment, described is "if one or more characteristic variables exceed the associated threshold values". Thus, it is a fundamental requisite in either embodiment that the characteristic variables are compared with the associated threshold values, respectively. Therefore, even if it was possible to apply the one or more characteristic variables to the method for determining the tendency of the vehicle to tilt about the longitudinal axis, as proposed in the above-described U.S. Patent, it would not be possible to appropriately determine the rolling motion to be used in the vehicle motion stability control according to the present invention. Also, it is important to determine how a braking force control is to be continued, or to be terminated.

SUMMARY OF THE INVENTION

Accordingly, it is an object of the present invention to provide a rolling motion stability control apparatus for restraining a roll increasing tendency of a vehicle to stabilize a rolling motion thereof, which is capable of estimating a roll increasing tendency of a vehicle accurately, to continue at least one of a braking force control appropriately, and terminate the same appropriately.

In accomplishing the above and other objects, the rolling motion stability control apparatus includes a wheel brake device for applying braking force to each wheel of the vehicle, and a turning direction determination device for determining a turning direction of the vehicle. The apparatus further includes a first braking force control device for applying a first braking force to the wheel through the wheel brake device, when the turning direction determination device determines that the vehicle is turned to one direction of the vehicle, and a second braking force control device for applying a second braking force to the wheel through the wheel brake device, when the turning direction determination device determines that the vehicle is turned to the other direction of the vehicle. And, a reference setting device is provided for setting references for starting controls of the first braking force control device and the second braking force control device into the references of predetermined values, respectively. The reference setting device is adapted to modify the reference for starting the control of the second braking force control device to be smaller than the predetermined value, when the turning direction determination device determines that the vehicle is turned to the one direction of the vehicle.

Or, the rolling motion stability control apparatus includes a wheel brake device for applying braking force to each wheel of the vehicle, a turning direction determination device for determining a turning direction of the vehicle, a first braking force control device for applying a first braking force to the wheel through the wheel brake device, when the turning direction determination device determines that the vehicle is turned to one direction of the vehicle, a second braking force control device for applying a second braking force to the wheel through the wheel brake device, when the turning direction determination device determines that the vehicle is turned to the other direction of the vehicle, a state variable acquiring device for acquiring a state variable indicative of a rolling motion of the vehicle, and a reference setting device for setting references for starting controls of the first braking force control device and the second braking force control device, respectively. The reference setting device is adapted to set the roll state variable acquired by the state variable acquiring device when the roll state variable exceeds the reference for starting the control of the first braking force control device, to be the reference for starting the control of the second braking force control device, in the case where the turning direction determination device determines that the vehicle is turned to the one direction of the vehicle.

The turning direction of the vehicle may be determined on the basis of at least one of lateral acceleration, yaw velocity and steering angle of the vehicle.

BRIEF DESCRIPTION OF THE DRAWINGS

The above stated object and following description will become readily apparent with reference to the accompanying drawings, wherein like referenced numerals denote like elements, and in which.

DESCRIPTION OF THE PREFERRED EMBODIMENTS

Figure 1:
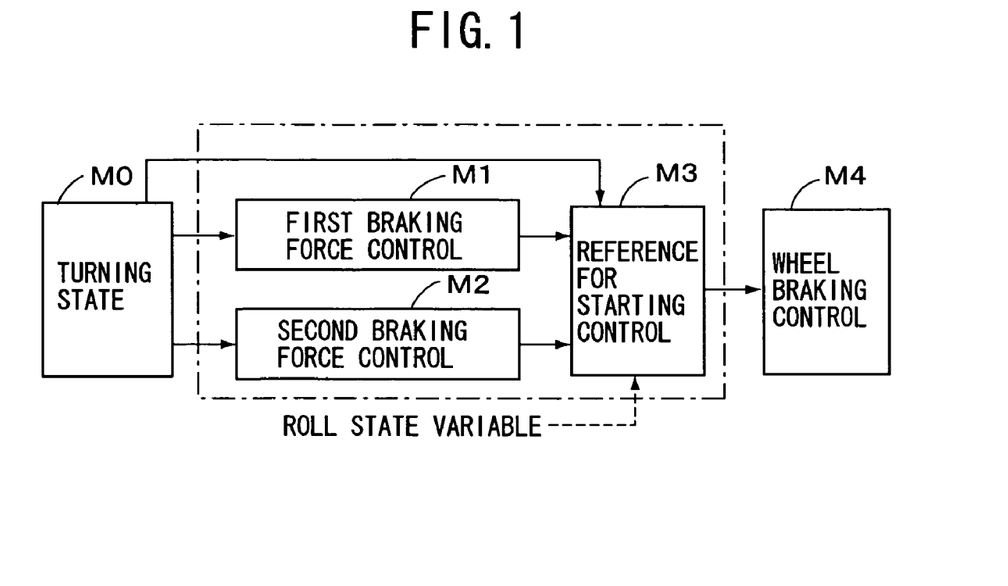
FIG. 1 is a schematic block diagram of a rolling motion stability control apparatus for a vehicle according to an embodiment of the present invention.

Referring to FIG. 1, there is schematically illustrated a rolling motion stability control apparatus for restraining a roll increasing tendency of a vehicle, with each wheel of the vehicle being braked by a wheel brake device M4, according to an embodiment of the present invention. The apparatus is provided with a turning direction determination device M0 for determining a turning direction of the vehicle, a first braking force control device M1 for applying a first braking force to the wheel through the wheel brake device M4, when the turning direction determination device M0 determines that the vehicle is turned to one direction of the vehicle, and a second braking force control device M2 for applying a second braking force to the wheel through the wheel brake device M4, when the turning direction determination device M0 determines that the vehicle is turned to the other direction of the vehicle. And, a reference setting device M3 is provided for setting references for starting controls of the first braking force control device M1 and the second braking force control device M2 into the references of predetermined values, respectively. The reference setting device M3 is adapted to modify the reference for starting the control of the second braking force control device M2 to be smaller than the predetermined value, when the turning direction determination device M0 determines that the vehicle is turned to the one direction of the vehicle. Accordingly, the first and second braking force control devices M1 and M2 are controlled on the basis of the references set by the reference setting device M3, so that the wheel brake device M4 applies the braking force to each wheel to restrain the roll increasing tendency of the vehicle, thereby to stabilize the rolling motion of the vehicle.

Or, as indicated by broken lines in FIG. 1, the apparatus may be so constituted that a roll state variable acquired when the roll state variable exceeds the reference for starting the control of the first braking force control device M1, to be the reference for starting the control of the second braking force control device M2, in the case where the turning direction determination device M0 determines that the vehicle is turned to the one direction of the vehicle. The turning direction determination device M0 is constituted to determine the turning direction of the vehicle on the basis of a lateral acceleration of the vehicle, for example.

Next will be explained the roll increasing tendency of the vehicle according to the present invention. The roll increasing tendency may be classified as the one which is caused by a rapid rolling motion (hereinafter, referred to as dynamic roll increasing tendency), the one which is caused by a relatively gradual rolling motion (hereinafter, static roll increasing tendency), and the one which has an intermediate characteristic between the dynamic roll increasing tendency and the static roll increasing tendency (hereinafter, intermediate roll increasing tendency). The dynamic roll increasing tendency is caused, provided that the rolling motion is rapidly increased, with the rapid steering operation or a reverse steering operation being made by a vehicle driver, and a suspension member abuts on a bound stopper to be compressed, so that a wheel, with the suspension member at a side thereof to be expanded, is forced to be lifted. The dynamic roll increasing tendency is likely to be caused in the case where the vehicle is turned to one direction and then turned to the other direction, i.e., during a so-called transient steering operation, rather than the case where the vehicle is moving straight and then rapidly turned. This is because the rolling motion has been created when the vehicle is steered to return from the one direction to the original position, so that the direction of the rolling motion will coincide with the created rolling motion when the vehicle is turned to the other direction, thereby to increase the rolling motion. Supposing that the vehicle is steered to return to the straight movement from the left turning operation, for example, the rolling motion is being created in the counter-clockwise direction with respect to the moving direction of the vehicle, whereas the rolling motion will be created further in the counter-clockwise direction, if the vehicle is steered to the right from the returned position.

Figure 2:
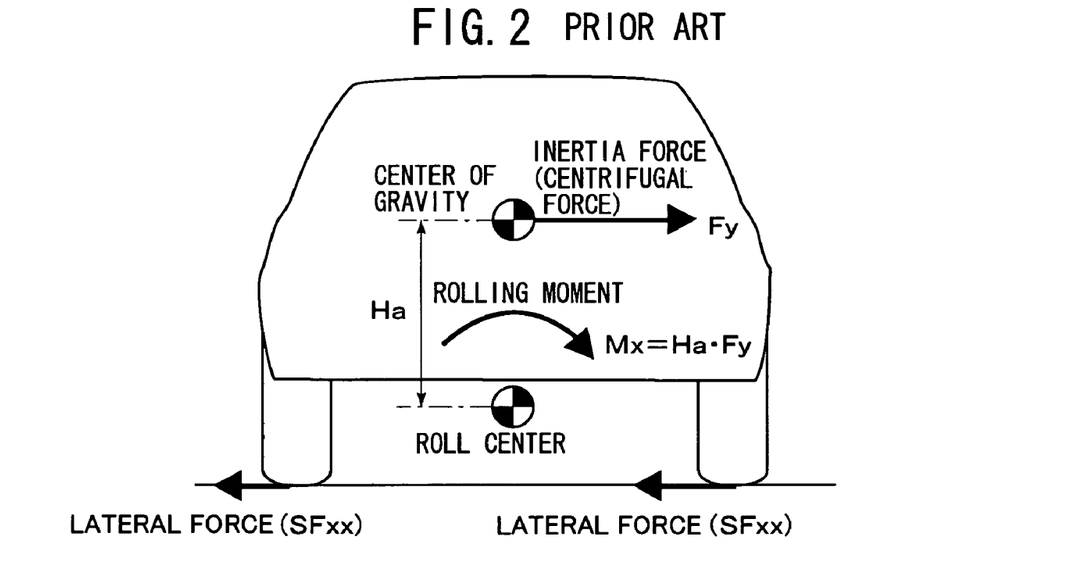
FIG. 2 is a diagram showing a relationship among state variables provided in a rolling motion of an ordinary vehicle.
Figure 3:
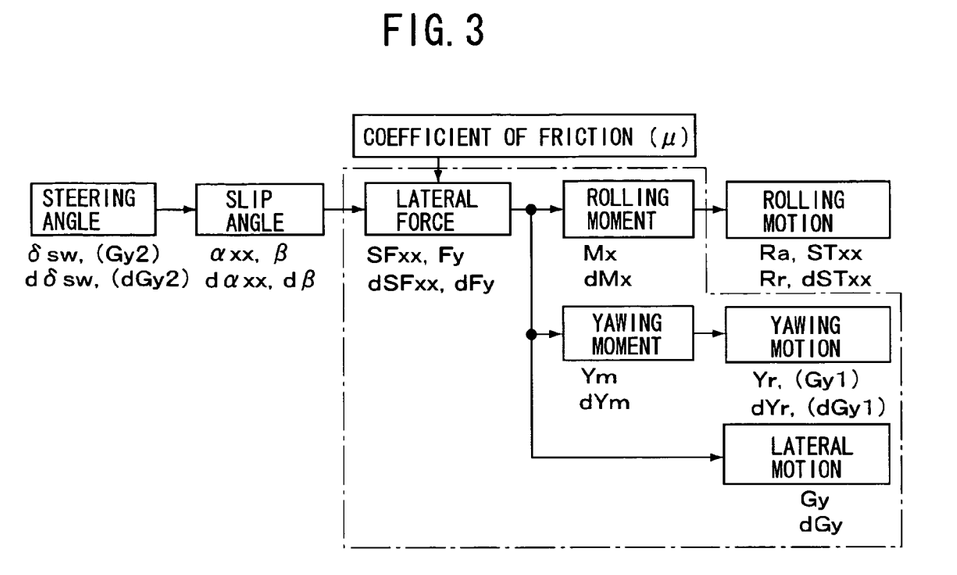
FIG. 3 is a block diagram showing state variables indicative of inputs of rolling motion of a vehicle according to the present invention.

Referring to FIGS. 2 and 3, will be explained the state variables of the vehicle rolling motion. With respect to the turning operation of the vehicle, a direction of the turning operation is indicated by a positive or negative sign. For example, a left turning operation is indicated by a positive sign, and a right turning operation is indicated by a negative sign. However, it is complicated to explain a comparison in magnitude, taking the signs into consideration. Therefore, the comparison in magnitude will be made on the basis of absolute values of them, hereinafter, unless they are defined specifically.

When a steering wheel (not shown) is operated by a vehicle driver, the vehicle is turned, with a slip angle (αxx) produced on each wheel, and a lateral force (SFxx) produced on each wheel, wherein "xx" designates each wheel, i.e., "fr" designates the wheel at the front right side as viewed from the position of a driver's seat, "fl" designates the wheel at the front left side, "rr" designates the wheel at the rear right side, and "rl" designates the wheel at the rear left side. In this case, an inertia force (centrifugal force) (Fy) acts on the gravity center of the vehicle, to balance with the lateral force produced on the wheel. However, the gravity center of the vehicle is not placed on the same position as the center of the rolling motion (i.e., roll center), so that there is a distance (Ha) between the gravity center and the roll center, to produce a rolling moment (Mx), i.e., (Mx)=(Ha)·(Fy). As a result, the rolling motion of the vehicle is created by the rolling moment, and if the rolling motion is excessive, it can be estimated that the vehicle is in the roll increasing tendency.

On the basis of the rolling motion dynamics as described above, a roll state variable (Rst) indicative of the rolling motion can be classified into an output state variable (Rot) indicative of an output (result) of the rolling motion, and an input state variable (Rin) indicative of an input (cause) of the rolling motion. As for the output state variable (Rot) relating to the output of the rolling motion, the roll angle (Ra) and roll velocity (Rr) are included. In view of movement of a suspension (not shown), a suspension stroke STxx and its velocity dSTxx are included, as well. Next, as for the input state variable (Rin) indicative of the input of the rolling motion, included are the steering wheel angle (δsw) of the steering wheel and steering wheel angular velocity (dδsw), wheel slip angle (αxx) and its velocity (dαxx), vehicle slip angle (β) and its velocity (dβ), wheel lateral force (SFxx) and its variation in time (dSFxx), vehicle inertia force (Fy) and its variation in time (dFy), and also rolling moment (Mx) of the direct input of the rolling motion, and its variation in time (dMx). As the inertia force (the sum of lateral force for all wheels) corresponds to the vehicle lateral acceleration, a vehicle lateral acceleration (Gy) detected by a lateral acceleration sensor GY (described later) and its variation in time (dGy) can be included in the input state variable (Rin). Also, as the lateral force produces a yawing motion of the vehicle, a yawing moment (Ym) and its variation in time (dYm), yaw velocity (Yr) and its variation in time (yaw acceleration) (dYr) can be employed as the input state variable (Rin) of the rolling motion.

In this case, as the lateral acceleration of the vehicle can be indicated by other state variables, according to equations as described hereinafter, they may be used for the input state variable (Rin). First of all, an estimated lateral acceleration (Gy1) obtained by the yaw velocity (Yr) can be calculated according to the following equation (1):

$$Gy1 = V \cdot Yr \quad (1)$$

where "V" is a vehicle speed.

Likewise, a variation in time (dGy1) of the estimated lateral acceleration (Gy1) can be calculated according to the following equation (2):

$$dGy1 = V \cdot dYr \quad (2)$$

where "dYr" is a variation in time of the yaw velocity (Yr), i.e., yaw acceleration.

Then, an estimated lateral acceleration (Gy2) obtained by the steering wheel angle (dδsw) can be calculated according to the following equation (3):

$$Gy2 = [V^2/\{L \cdot (1+Kh \cdot V^2)\}] \cdot (δsw/N) \quad (3)$$

where "L" is a wheel base, "Kh" is a stability factor, and "N" is a steering gear ratio.

Or, if Kh=0 (neutral steering) is used, the estimated lateral acceleration (Gy2) can be calculated according to the following equation (3'):

$$Gy2 = (V^2/L) \cdot (δsw/N) \quad (3')$$

Likewise, a variation in time (dGy2) of the estimated lateral acceleration (Gy2) can be calculated according to the following equation (4):

$$dGy2 = [V^2/\{L \cdot (1+Kh \cdot V^2)\}] \cdot (d\delta sw/N) \qquad (4)$$

where "dδsw" is a steering wheel angular velocity. Or, if Kh=0 (neutral steering) is used, the estimated lateral acceleration (Gy2) can be calculated according to the following equation (4')

$$dGy2 = (V^2/L) \cdot (d\delta sw/N) \qquad (4')$$

Figure 13:
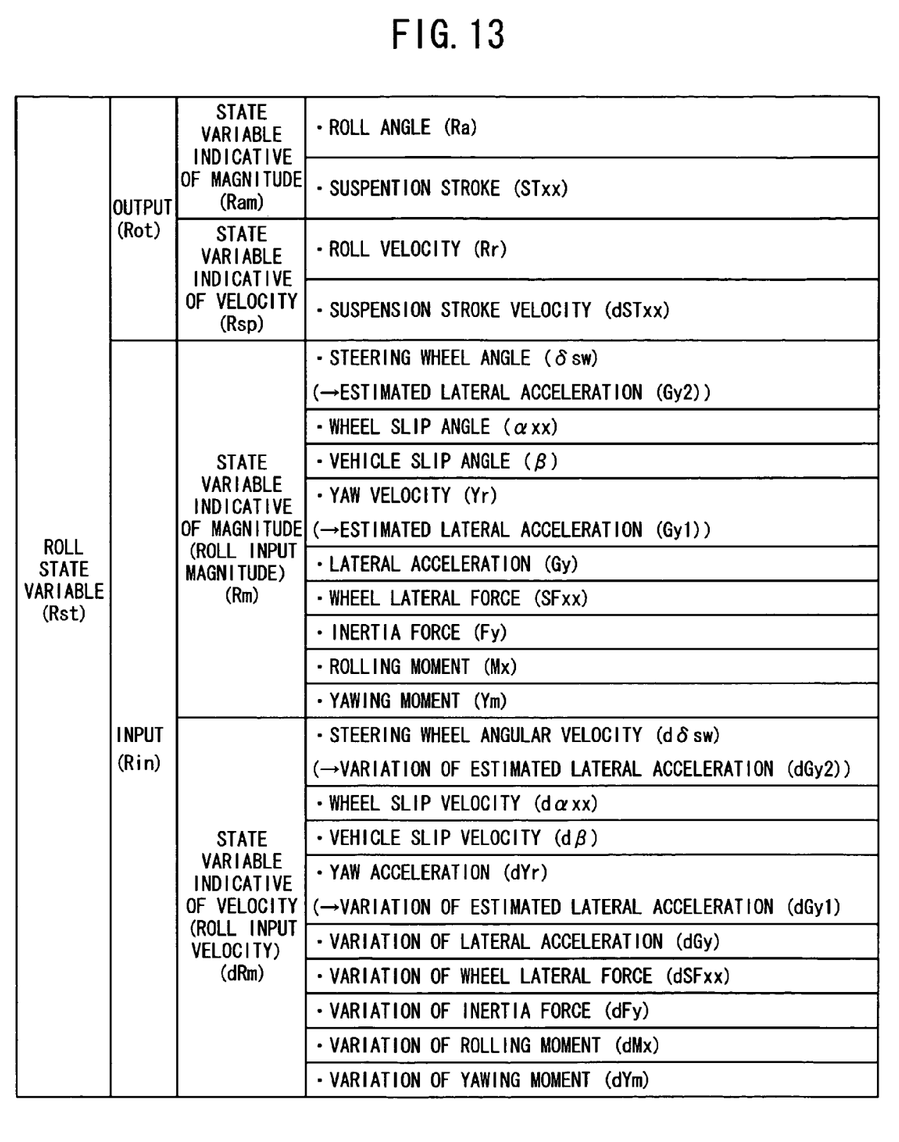
FIG. 13 is a table showing roll state variables indicative of inputs of rolling motion according to an embodiment of the present invention.

The roll state variable (Rst) indicative of the rolling motion as described above is classified as shown in FIG. 13, wherein the roll state variables are classified into the output (result) and input (cause), and wherein the roll input magnitude (Ram, Rm) indicative of magnitude of the input of the rolling motion, and the roll input velocity (Rsp, dRm) indicative of velocity of the input of the rolling motion are classified, separately. In FIG. 13, the state variables following an arrow as indicated in parentheses are those obtained through the calculations.

As the rolling motion is resulted from the turning operation of the vehicle, the direction or variation of turning operation of the vehicle can be determined on the basis of the sign of the vehicle state variable as shown in FIG. 13. That is, the direction of turning operation of the vehicle can be determined on the basis of the sign of either one of the state variables (Ram and Rm) indicative of the magnitude of the rolling motion. Furthermore, the variation of turning operation of the vehicle, i.e., whether the turning operation is being increased or decreased, can be determined on the basis of one of the sign of either one of the state variables (Ram and Rm) indicative of the magnitude of the rolling motion, and the sign of either one of the state variables (Rsp and dRm) indicative of the velocity of the rolling motion. In the case where the sign of the state variable indicative of the magnitude of the rolling motion is positive, during the left turning operation of the vehicle, for example, if the sign of the state variable indicative of the velocity of the rolling motion is positive, so that their signs coincide with each other, it is determined that the vehicle is turning to the left, and the turning operation is being increased. On the contrary, if the sign of the state variable indicative of the velocity of the rolling motion is negative, so that their signs do not coincide with each other, it is determined that the vehicle is turning to the left, and the turning operation is being decreased.

Figure 4:
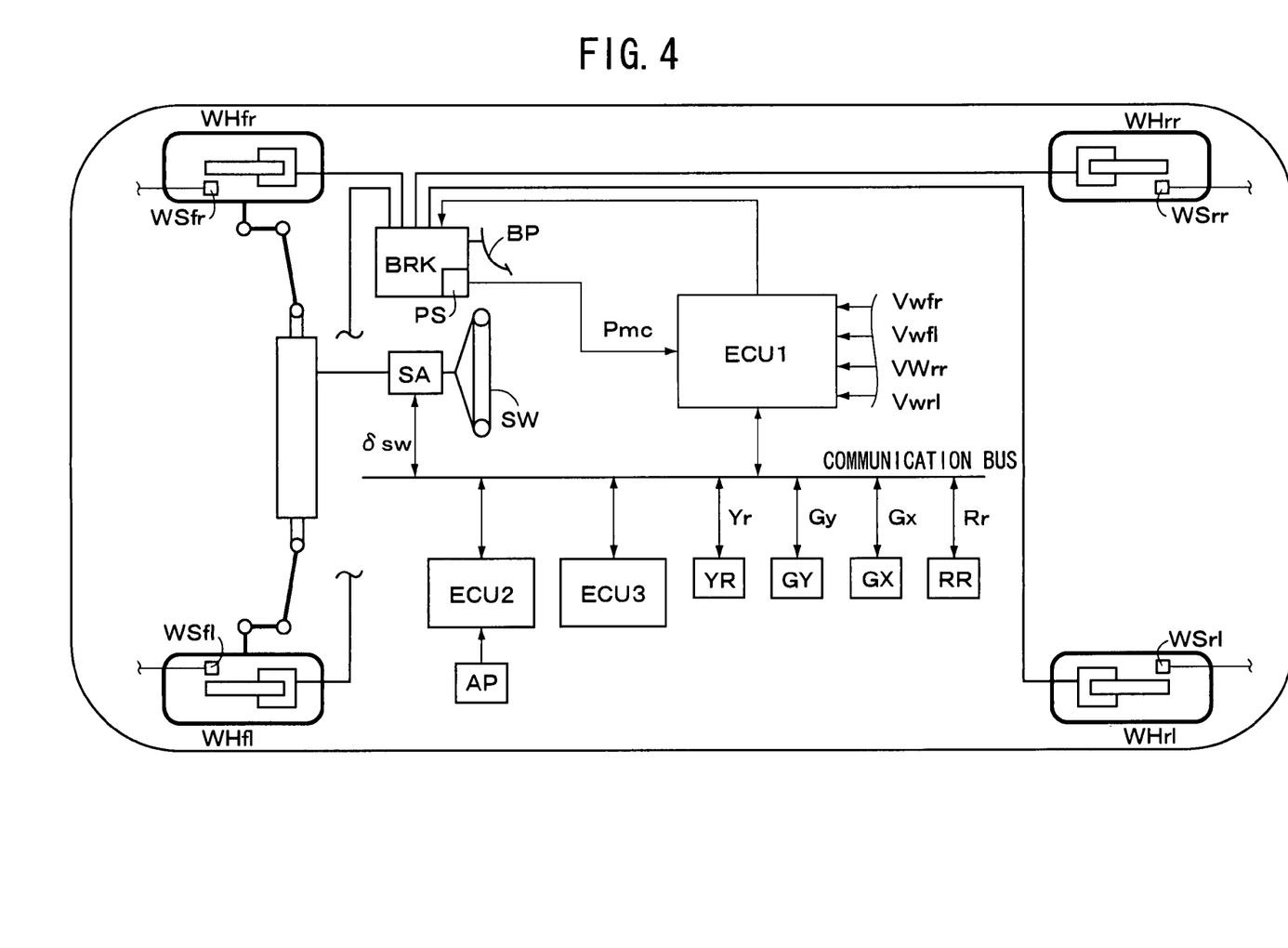
FIG. 4 is a schematic block diagram of a vehicle having a rolling motion stability control apparatus according to an embodiment of the present invention.

Referring to FIG. 4, there is schematically illustrated an overall structure of a vehicle with the vehicle motion stability control apparatus according to an embodiment of the present invention. A brake system electronic control unit ECU1, engine system electronic control unit ECU2, and instrument panel electronic control unit ECU3 are connected to one another through a communication bus, so that the information for each control unit can be fed from other control units. Furthermore, there are provided a steering angle sensor SA for detecting the steering angle (δsw) of a steering wheel SW, a longitudinal acceleration sensor GX for detecting a vehicle longitudinal acceleration (Gx), a lateral acceleration sensor GY for detecting a vehicle lateral acceleration (Gy), a yaw rate sensor YR for detecting a yaw rate (Yr) of the vehicle, and a roll velocity sensor RR for detecting a roll velocity (Rr) of the vehicle, which are electrically connected to each electronic control unit to supply thereto the sensor signals. A brake actuator BRK is provided for applying a braking force to each wheel in response to depression of a brake pedal BP of the vehicle driver, and controlling the braking force on each wheel independently in response to a signal from the electronic control unit ECU1, when the rolling motion stability control is required, as described later. A pressure sensor PS is provided in the brake actuator BRK for detecting an amount of operation of the brake pedal BP by the vehicle driver, to feed its detected pressure (Pmc) to the brake system electronic control unit ECU1. The braking force control for the rolling motion stability control can be performed, even in the case where the vehicle driver is not operating the brake pedal BP.

As shown in FIG. 4, at each wheel WHxx of the vehicle, there is provided a wheel speed sensor WSxx, which is connected to the electronic control unit ECUL. And, a signal having pulses proportional to a rotational speed of each wheel, i.e., a wheel speed signal is fed to the electronic control unit ECU1, wherein a vehicle speed (V) in the longitudinal direction of the vehicle is calculated on the basis of wheel speed signals (Vwxx) fed from the wheel speed sensors WSxx. The amount of operation (Ap) of an accelerator pedal (not shown) is detected by an accelerator pedal sensor AP, and fed to the electronic control unit ECU1 through the communication bus as described before.

According to the present embodiment, the vehicle rolling motion stability control is performed in the brake system electronic control unit ECU1. When the vehicle rolling motion stability control starts, the braking force applied to each wheel is controlled independently, so as to restrain the vehicle roll increasing tendency. Furthermore, signals for controlling the driving force applied to the wheel are fed to the engine system electronic control unit ECU2 through the communication bus, so as to reduce engine torque by controlling a throttle opening, ignition timing, amount of fuel to be injected and so on, and control the driving force applied to the wheel. At the same time, notification signals are fed to the instrument panel electronic control unit ECU3 through the communication bus, so as to actuate a visible or audible annunciator (not shown) for notifying the vehicle driver of the vehicle state.

Figure 5:
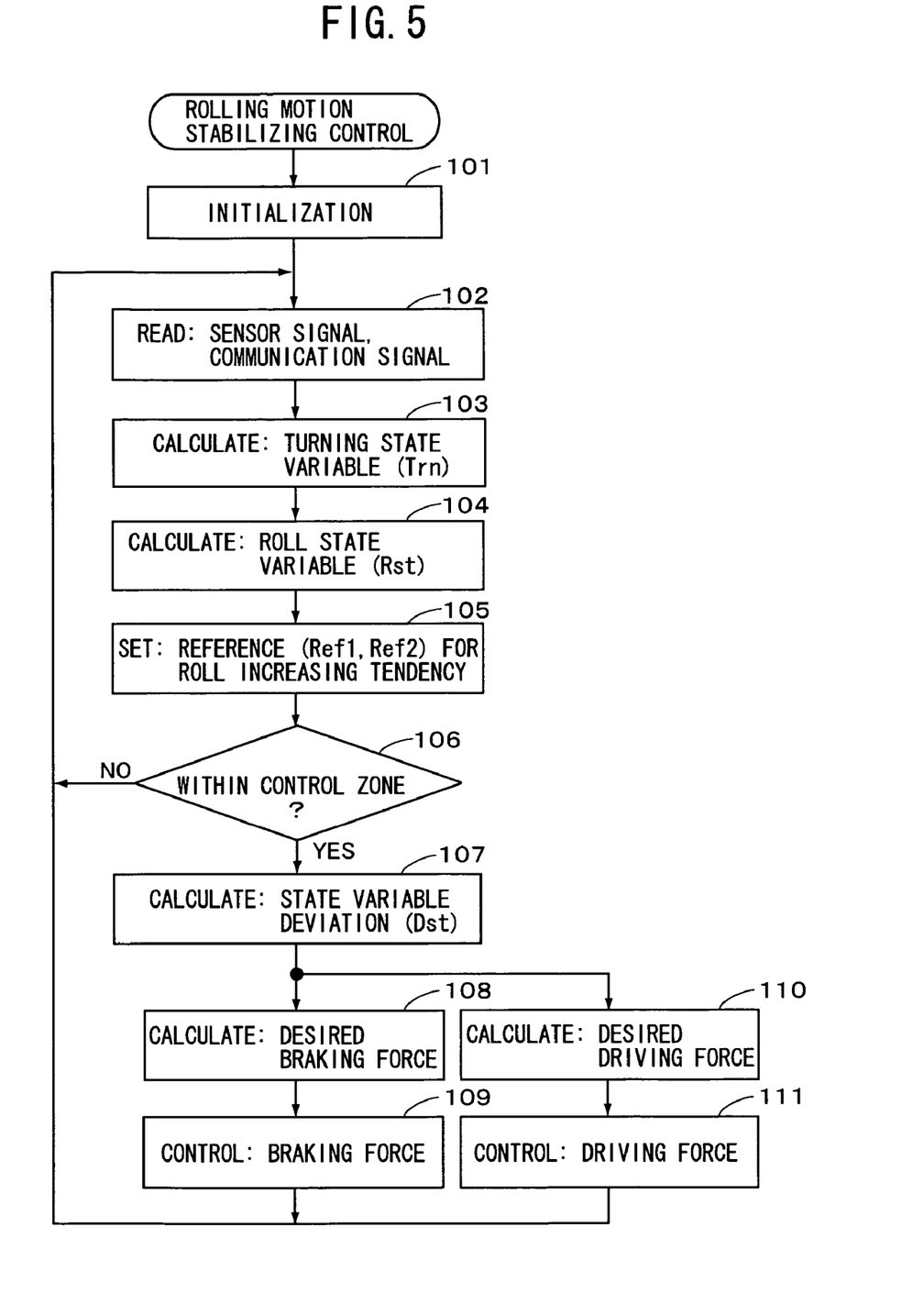
FIG. 5 is a flowchart for an example of a rolling motion stability control according to an embodiment of the present invention.

Referring to FIG. 5, the rolling motion stability control according to the present embodiment will be performed as follows. At the outset, the program provides for initialization of the system at Step 101, and the signals detected by various sensors and communication signals are read at Step 102. Then, calculated at Step 103 is a turning state variable (Trn), which indicates a condition or level of turning operation of the vehicle, such as the lateral acceleration (Gy) and yaw velocity (Yr), and which may employ an estimated lateral acceleration (Gy2) calculated on the basis of the steering angle (δsw). The turning direction can be determined by the sign (positive or negative) of the turning state variable. Next, at Step 104, the roll state variable (Rst) indicative of the rolling motion of the vehicle. Then, references (Ref1 and Ref2) for estimating the roll increasing tendency are calculated at Step 105 in response to the turning operation of the vehicle, and set respectively, in order to estimate the roll increasing tendency of the vehicle. The references (Ref1 and Ref2) for estimating the roll increasing tendency (hereinafter, simply referred to as references (Ref1 and Ref2)) are set initially to be of the same characteristic, while the turning directions are different from each other. However, in response to the turning state variable (Trn) obtained when the vehicle is turned to one direction (i.e., first turning operation), the references for estimating the roll increasing tendency obtained when the vehicle is turned to the other direction (i.e., second turning operation) will be changed, as will be described later. For example, on the basis of the turning state variable (Trn) obtained when the vehicle is turned to the left, the references for estimating the roll increasing tendency obtained when the vehicle is turned to the right will be modified. Instead of the turning state variable, the state variables (Rsp and dRm) indicative of the velocity of the rolling motion, as explained with reference to FIG. 2, may be used.

Then, it is determined at Step 106 whether the roll state variable (Rst) is within a control zone relative to the references (Ref1 and Ref2). In this respect, the control zone is a zone wherein the braking force control and driving force control are required to stabilize the rolling motion of the vehicle. If it is determined at Step 106 that the roll state variable (Rst) is outside of the control zone relative to the references (Ref1 and Ref2), i.e., if it is determined that the roll state variable (Rst) is equal to or smaller than the reference (Ref1) or (Ref2), the program returns to Step 102, without the braking force control and driving force control being performed. On the contrary, if it is determined that the roll state variable (Rst) is within the control zone, the program proceeds to Step 107, where a deviation between the roll state variable (Rst) and the reference (Ref1) or (Ref2) is calculated, to provide a state variable deviation (Dst). Accordingly, the program proceeds to Step 108 where a desired braking force (BFdxx) is calculated for each wheel on the basis of the state variable deviation (Dst). And, the brake actuator BRK is controlled in response to the desired braking force (BFdxx) at Step 109. When the desired braking force (BFdxx) is calculated, may be considered the amount of operation of the brake pedal BP made by the vehicle driver, e.g., master cylinder pressure to be input as a detected pressure (Pmc). Likewise, a desired driving force is calculated at Step 111 on the basis of the state variable deviation (Dst), so that the amount of engine torque to be reduced is determined. Then, an engine system actuator (not shown) is actuated at Step 111 to control the throttle opening, ignition timing, amount of fuel to be injected and so on. When the desired driving force is calculated, may be considered the amount of operation of the accelerator pedal AP made by the vehicle driver.

Figure 6:
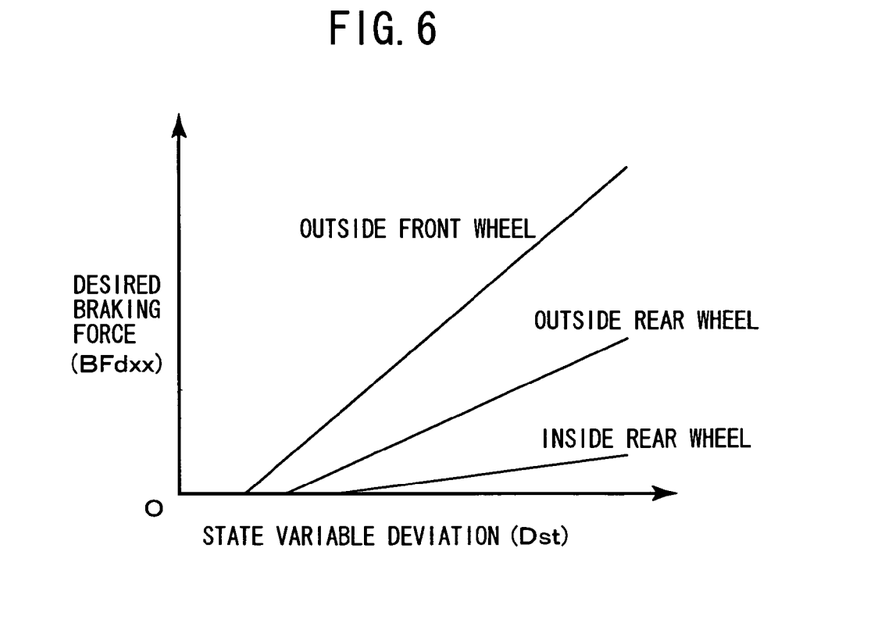
FIG. 6 is a diagram showing an example of a map for calculating a desired braking force provided for each wheel of a front wheel located on the outside of a curve during cornering operation of a vehicle, a rear wheel located on the outside of the curve, and a rear wheel located on the inside of the curve, on the basis of a state variable deviation, according to an embodiment of the present invention.

The desired braking force (BFdxx) obtained at Step 108 in FIG. 5 is calculated on the basis of the state variable deviation (Dst) obtained at Step 107, to provide the desired braking force (BFdxx) for each wheel as shown in FIG. 6. That is, in order to restrain the roll increasing tendency of the vehicle with an appropriate yawing moment being maintained, calculated is the desired braking force (BFdxx) for each wheel of a front wheel located on the outside of a curve in the vehicle's path during cornering operation of the vehicle, a rear wheel located on the outside of the curve, and rear wheel located on the inside of the curve, on the basis of the state variable deviation (Dst). Thus, the braking force control is executed in response to the state variable deviation (Dst), such that if the rolling motion is very severe with respect to the roll increasing tendency of the vehicle, relatively strong braking force will be applied to restrain the roll increasing tendency. On the contrary, if the state variable deviation (Dst) is relatively small, while the roll increasing tendency of the vehicle has been found, minimal braking force will be applied to stabilize the roll increasing tendency. In order to reduce the vehicle speed rapidly, with the appropriate yawing moment being maintained, one wheel or plurality of wheels may be selected as the wheel to be controlled. For example, it is effective to apply the braking force to all of four wheels, one wheel of the front wheel located on the outside of the curve during cornering operation of the vehicle, two front wheels and the rear wheel located on the inside of the curve, or two front wheels and the rear wheel located on the outside of the curve.

Figure 7:
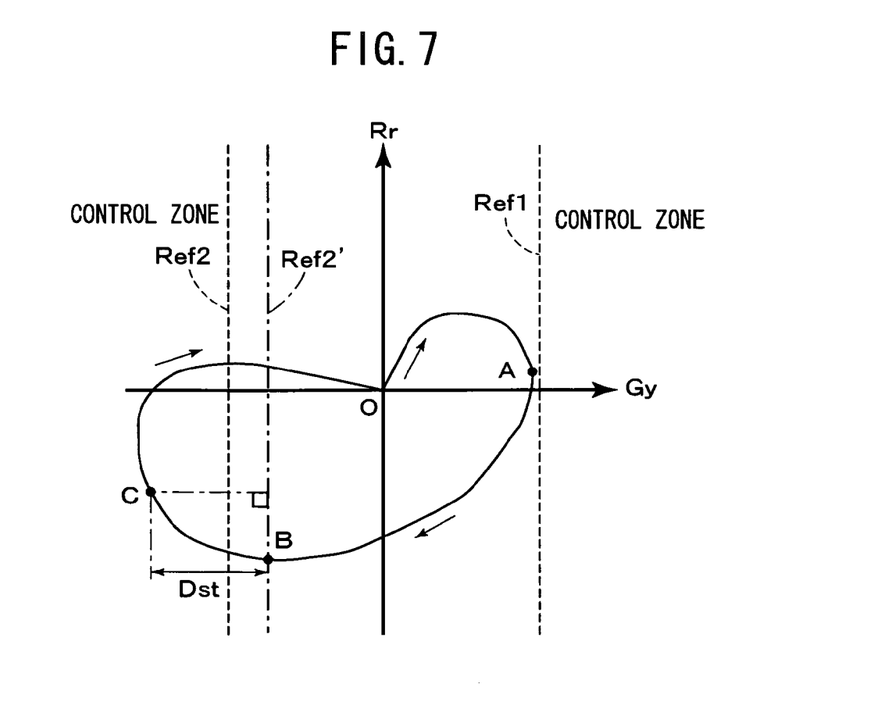
FIG. 7 is a diagram showing an example of operation using the control map as shown in FIG. X, according to an embodiment of the present invention.

Next, referring to FIG. 7, will be explained provision of the references (Ref1 and Ref2) used at Step 105, or the like. FIG. 7 shows the rolling motion of the vehicle on a state variable plane with the lateral acceleration (Gy) and roll velocity (Rr). When the control operation begins, the references (Ref1 and Ref2) are set to be the same, so that the reference (Ref2) is provided to be symmetrical relative to the reference (Ref1) about the origin (0). In FIG. 7, when the rolling motion of the vehicle is caused, the roll state variable is moved from the origin (0) indicative of the straight moving operation, in a direction as indicated by an arrow. As the roll state variable will not reach the reference (Ref1) for the left turning operation in FIG. 7, the braking force control and driving force control for stabilizing the rolling motion will not be performed. In this case, a maximal value of the turning state variable (Trn) indicative of the condition or level of turning operation, e.g., lateral acceleration (Gymax) at a point (A) in FIG. 7, is memorized. If the maximal value of the turning state variable (Trn) is equal to or greater than a predetermined value, or in response to the maximal value, the reference for estimating the roll increasing tendency in case of the right turning operation, i.e., turning operation to the opposite direction, is modified from the reference (Ref2) to a reference (Ref2'). That is, the reference (Ref2') is modified to be made smaller than the initially set reference (Ref2), so that the roll state variable is likely to be fallen within the control zone, in case of the next right turning operation. Also, as the state variable deviation (Dst) is calculated to be relatively large, relatively large braking force will be applied to the wheel.

According to the embodiment as described above, therefore, the dynamic roll increasing tendency can be restrained certainly, even in case of such a transient steering operation that the steering wheel SW is steered from one direction to the other direction, which operation is likely to cause the dynamic roll increasing tendency. Although it has been provided that the roll state variable does not exceed the reference (Ref1) for the initial turning operation, in FIG. 7, it is not an issue to be considered whether the roll increasing tendency is estimated in the initial turning operation, according to the present invention, but the condition or level of the turning operation should be the issue to be considered. Even if the roll increasing tendency was estimated in the initial left turning operation, therefore, the reference (Ref2) for the next right turning operation should be modified.

Figure 8:
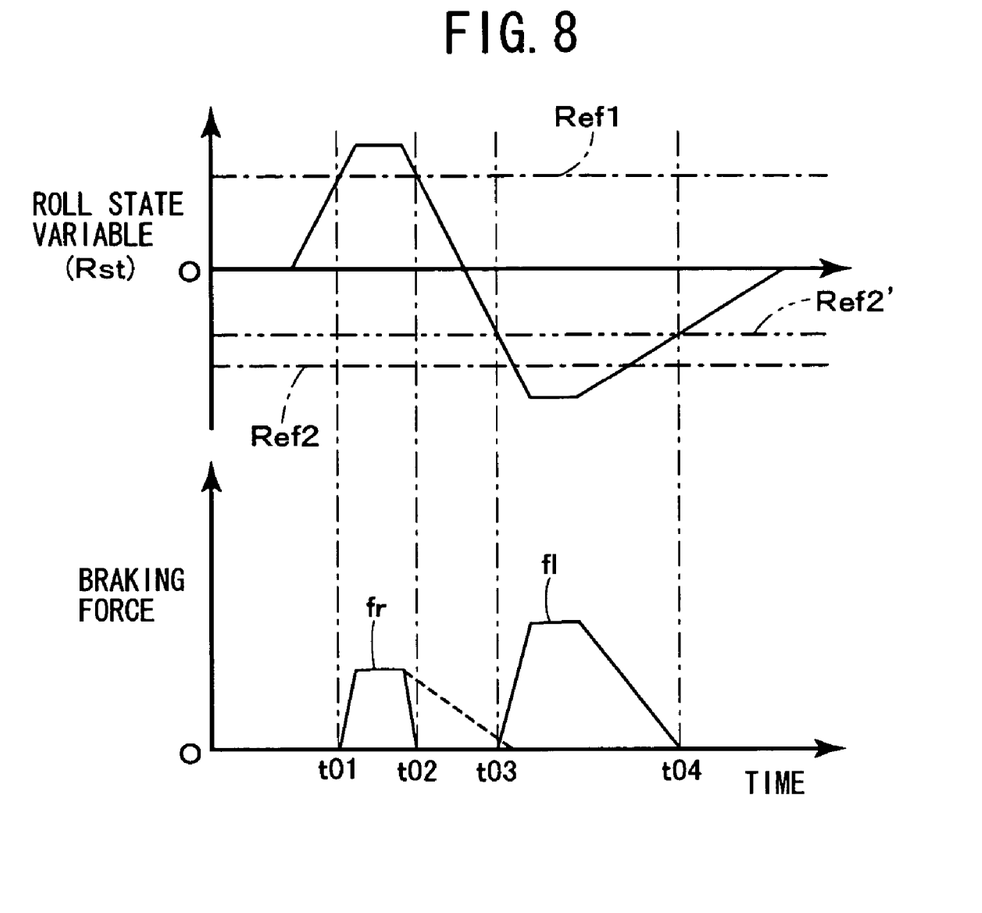
FIG. 8 is a time chart showing a control state using a control map as shown in FIG. 7 according to an embodiment of the present invention.

Next will be explained the operation of the apparatus as shown in FIGS. 5-7, referring to FIG. 8 which shows variation in time of the braking force applied to the front wheel located at the outside of the curve during cornering operation of the vehicle, which wheel is most effective to stabilize the rolling motion. The braking force control is not limited to the front wheel located at the outside of the curve, according to the present invention. At the outset, in the case where the vehicle is turned to one direction (hereinafter, referred to as first turning operation, left turn in FIG. 8), and if the roll state variable (Rst) exceeds the reference (Ref1), then the braking force control is performed to stabilize the rolling motion of the vehicle. In FIG. 8, the initial turning operation (first turning operation) is the one to the left, the front wheel located at the outside of the curve is the front right wheel, to which the braking force is applied at first at the time (t01). Consequently, the roll state variable (Rst) in the left turning operation is decreased to be smaller than the reference (Ref1), so that the braking force control is terminated at the time (t02). In this case, in order to restrain the influence to the rolling motion affected by a rapid decrease of the braking force, the braking force may be so controlled to be decreased gradually, with decreasing speed of the braking force being limited, as indicated by a broken line in FIG. 8.

Next, in the case where the vehicle is turned to the other direction (hereinafter, referred to as second turning operation, right turn in FIG. 8), the dynamic roll increasing tendency is likely caused in the transient steering operation of the steering wheel SW. Therefore, in the case where the vehicle is turned from one direction to the other direction (from the left turn to the right turn in FIG. 8), with respect to the reference for estimating the roll increasing tendency for the second turning operation, the reference (Ref2) is modified to be smaller in response to the turning state variable (Trn) or the state variables (Rsp and dRm) indicative of the velocity of the rolling motion, to provide the reference (Ref2'). Thus, when the vehicle is shifted from the first turning operation to the second turning operation, the reference for estimating the roll increasing tendency for the second turning operation is modified to be small. Consequently, the braking force is applied to the wheel in the second turning operation, i.e., the braking force is applied to the front left wheel which corresponds to the front wheel located at the outside of the curve in the right turning operation, is initiated at the time (t03), with the roll state variable (Rst) being smaller than that in the first turning operation. Also, as the reference (Ref2') is relatively small, the state variable deviation (Dst) is calculated to be relatively large, so that relatively large braking force will be applied to the wheel. As a result, the dynamic roll increasing tendency is accurately determined, to achieve the braking force control certainly.

According to the embodiment as described above, the reference for estimating the roll increasing tendency for the second turning operation is modified in response to the turning state variable or the state variables indicative of the velocity of the rolling motion of the first turning operation. However, the present invention is not limited to that embodiment, but may provide the reference for estimating the roll increasing tendency, and a control reference for performing the braking force control and driving force control, to be of different characteristics from each other. Hereinafter will be explained referring to FIG. 9, another embodiment, wherein the roll increasing tendency is estimated on the basis of the roll input magnitude (Rm) and roll input velocity (dRm), and the braking force control and driving force control are performed to stabilize the rolling motion, on the basis of the roll input magnitude (Rm). In order to detect the state variables indicative of the outputs of the rolling motion, a roll velocity sensor or suspension stroke sensor will be required. In this case, however, the state variables indicative of inputs of the rolling motion are used, as the characteristic indicative the rolling motion, and the state variables indicative of inputs of the rolling motion can be obtained through components of an Electronic Stability Control (abbreviated as ESC), which is beneficial in cost.

Figure 9:
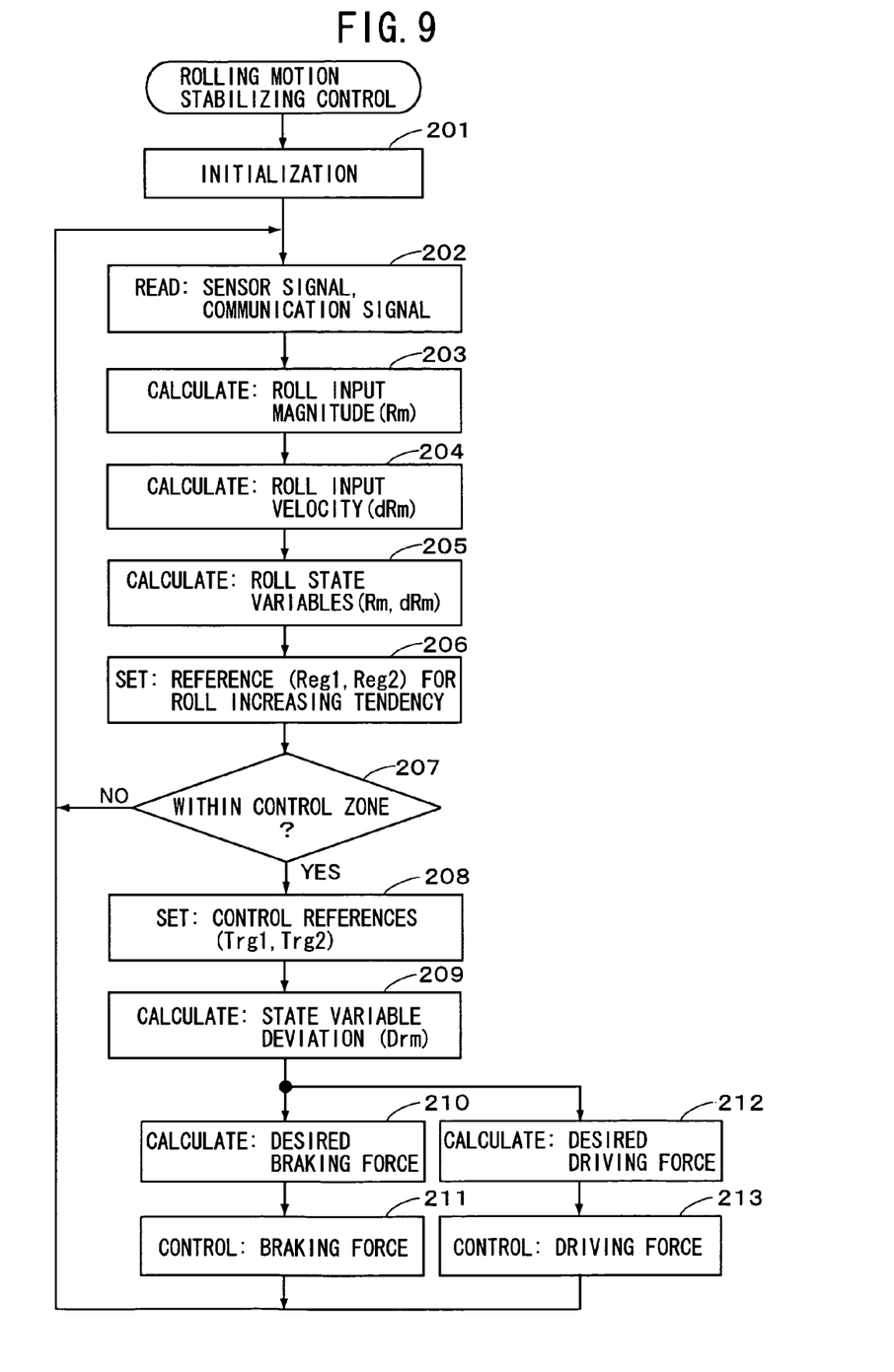
FIG. 9 is a flowchart for an example of a rolling motion stability control according to another embodiment of the present invention.

In FIG. 9, the program provides for initialization of the system at Step 201, and the signals detected by various sensors and communication signals are read at Step 202. Then the program proceeds to Step 203, where the roll input magnitude (Rm) indicative of magnitude of the input of the rolling motion is calculated, and further proceeds to Step 204, where the roll input velocity (dRm) indicative of velocity of the input of the rolling motion is calculated. The roll input magnitude (Rm) and roll input velocity (dRm) are the state variables as shown in FIG. 13, each of which can be calculated by known methods. The direction of turning operation of the vehicle and the variation of turning operation of the vehicle can be determined on the basis of the signs of the roll input magnitude (Rm) and the roll input velocity (dRm), as described before. At Step 205, therefore, the state variable indicative of the input of actual rolling motion, i.e., roll state variable, is indicated by (Rm, dRm), with the roll input magnitude (Rm) and the roll input velocity (dRm) being employed as variables. Next, reference characteristics for use in estimating the vehicle roll increasing tendency are set at Step 206, to provide references (Reg1 and Reg2) for estimating the roll increasing tendency, i.e., the reference for determining the left turn and right turn. The references (Reg1 and Reg2) are set in advance on the basis of the vehicle dimensions or the like, or may be set according to vehicle states such as the vehicle speed. And, the references (Reg1 and Reg2) are initially set to be of the same characteristic.

Then, it is determined at Step 207 whether the roll state variable (Rm, dRm) is within a control zone relative to the references (Reg1 and Reg2) for estimating the roll increasing tendency. If it is determined at Step 207 that the roll state variable (Rm, dRm) is outside of the control zone relative to the reference (Reg1 or Reg2) for estimating the roll increasing tendency, the program returns to Step 202, without the braking force control and driving force control being performed. On the contrary, if it is determined that the roll state variable (Rm, dRm) is within the control zone, the program proceeds to Step 208, where control references (Trg1 and Trg2) for controlling the braking force control and driving force control are provided. Then, the state variable deviation (Drm) is calculated at Step 209 on the basis of the roll input magnitude (Rm) and the control references (Trg1 and Trg2). Accordingly, the program proceeds to Step 210 where the desired braking force (BFdxx) is calculated for each wheel on the basis of the state variable deviation (Drm). And, the brake actuator BRK is controlled in response to the desired braking force (BFdxx) at Step 211. Likewise, a desired driving force is calculated at Step 212 on the basis of the state variable deviation (Drm), so that the amount of engine torque to be reduced is determined. Then, an engine system actuator (not shown) is actuated at Step 213 to control the throttle opening, ignition timing, amount of fuel to be injected and so on.

Next, referring to FIG. 10, will be explained determination of the state variable being fallen in the control zone, provision of control references (Trg1 and Trg2), and calculation of the state variable deviation (Drm) which are made at Steps 207-209, respectively. The origin (0) indicates that the vehicle is moving straight, and when the vehicle is turned by the steering operation of the vehicle driver, the roll input magnitude (Rm) and the roll input velocity (dRm) are increased in a direction as indicated by an arrow in FIG. 10. The roll input magnitude (Rm), which is obtained when the roll state variable (Rm, dRm) crosses the reference (Reg1) in a direction to be increased, is used to provide the control reference (Trg1) for the first turning operation (left turn in FIG. 10). That is, the roll input magnitude (Rm), which is obtained at the position (A), when the roll state variable (Rm, dRm) exceeds the reference (Reg1), i.e., characteristic of (c1-d1-e1-f1) in FIG. 10. The control reference (Trg2) for the second turning operation (right turn in FIG. 10) is provided on the basis of the control reference (Trg1) for the first turning operation. That is, the control reference (Trg2) for the second turning operation is provided to be symmetrical relative to the control reference (Trg1), about the origin (0). Then, in the second turning operation, the roll increasing tendency is estimated on the basis of the control reference (Trg2), as will be described later.

With respect to the determination whether the roll state variable has been fallen within the control zone, it is made by determining whether the roll state variable (Rm, dRm) crosses the reference (Ref1) in a direction to be increased. In other words, it is determined whether the roll input magnitude (Rm) is larger than the control reference (Trf1). On the contrary, within the control zone, the deviation between the roll input magnitude (Rm) and the control reference (Trf1) is calculated to provide the state variable deviation (Drm). For example, the state variable deviation (Drm) can be obtained as a normal distance extending vertically from the point (B1) in FIG. 10 to the control reference (Trg1). Then, the braking force control and driving force control is performed on the basis of the state variable deviation (Drm), the rolling motion of the vehicle is decreased gradually, and will be terminated when the roll input magnitude (Rm) crosses the control reference (Trg1) in a direction to be decreased, at the point (C1) in FIG. 10. In this case, as the roll input magnitude (Rm) has been decreased sufficiently, the rolling motion stability control will be made effectively.

Thus, when the turning motion of the vehicle is shifted from one direction to the other direction (from the first turning operation to the second turning operation), the control for the first turning operation is terminated at the point (C1). Then, in the second turning operation, the roll increasing tendency is estimated on the basis of the control reference (Trg2) in the second turning operation. That is, when the roll input magnitude (Rm) crosses the control reference (Trg2) in a direction to be increased, at the point (D1), it is fallen within the control zone for the other direction (second turning operation), to start the control, again. Thus, in the second turning operation, the roll increasing tendency is estimated on the basis of the control reference (Trg2), so that the control is initiated, with the roll input magnitude (Rm) being smaller than the reference (Reg2) for estimating the roll increasing tendency which is set initially. For example, if the reference (Reg2) is employed, the roll increasing tendency will be estimated at the point (H1). However, the roll increasing tendency is changed to be estimated on the basis of the control reference (Trg2), the roll increasing tendency is estimated at the point (D1). As a result, the rolling motion will be decreased, so that the control will be terminated, when the roll input magnitude (Rm) crosses the control reference (Trg2) in a direction to be decreased, at the point (F1). And, the state variable deviation (Drm) in the second turning operation can be obtained as that in the first turning operation. Although FIG. 10 shows a case where the roll state variable (Rm, dRm) of the vehicle crosses a line segment (d1-e1) of the reference (Reg1), there may be a case where the roll state variable (Rm, dRm) crosses a line segment (c1-d1) in a direction to be increased. In the latter case, the control reference (Trg1) is set to be of a characteristic extending the line segment (c1-d1).

According to the embodiment as described above, therefore, the reference for estimating the roll increasing tendency, and the control reference for performing the braking force control and driving force control are provided to be of different characteristics from each other, and the control reference (Trg2) for the second turning operation is provided on the basis of the control reference (Trg1) for the first turning operation. And, in the second turning operation, the roll increasing tendency is estimated on the basis of the control reference (Trg2). As a result, the dynamic roll increasing tendency can be restrained certainly, even in case of such a transient steering operation that the steering wheel SW is steered from one direction to the other direction, and the control is continued until the rolling motion will be decreased sufficiently, to achieve the control effectively.

Figure 10:
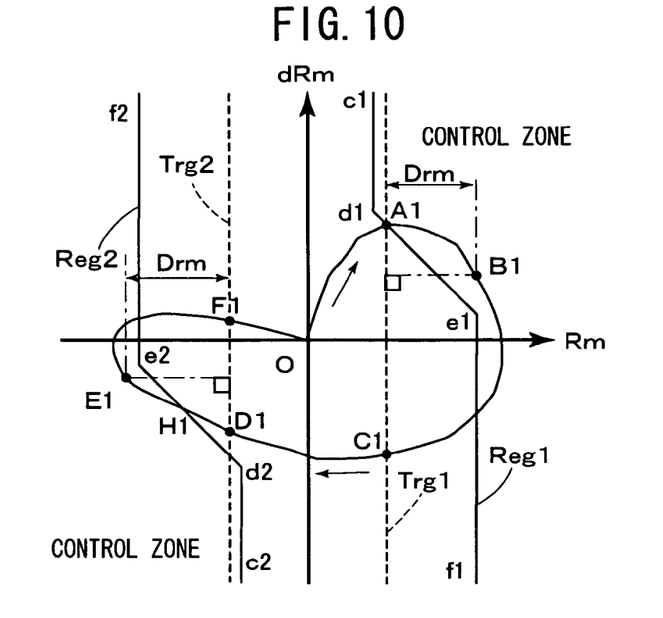
FIG. 10 is a diagram showing an example of operation using a control map according to another embodiment of the present invention.
Figure 11:
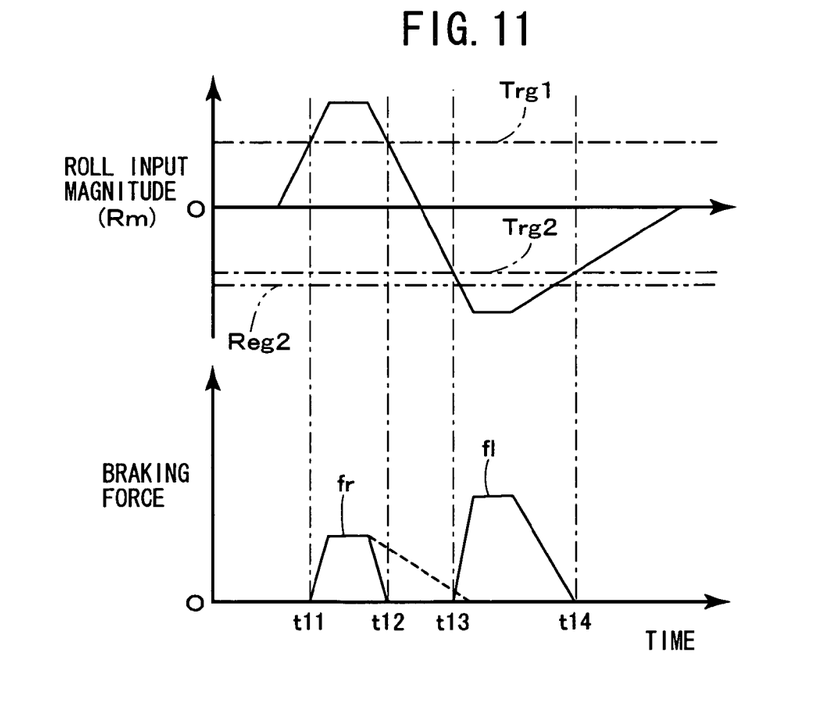
FIG. 11 is a time chart showing a control state using a control map as shown in FIG. 10 according to another embodiment of the present invention.

FIG. 11 is a time chart showing the operation of the apparatus as shown in FIGS. 9 and 10. In FIG. 11, illustrated is variation in time of the braking force applied to the front wheel located at the outside of the curve during cornering operation of the vehicle, which wheel is most effective to stabilize the rolling motion, while the braking force control is not limited to the front wheel located at the outside of the curve, according to the present invention. At the outset, in the case where the vehicle is turned to one direction (hereinafter, referred to as first turning operation, left turn in FIG. 11), and if the roll state variable (Rm, dRm) crosses the reference (Reg1) in a direction to be increased, then the control reference (Trg1) for the first turning operation is set. If the roll input magnitude (Rm) exceeds the control reference (Trg1), the braking force control is performed to stabilize the rolling motion of the vehicle. In FIG. 11, the initial turning operation (first turning operation) is the one to the left, the front wheel located at the outside of the curve is the front right wheel, to which the braking force is applied at first at the time (t11). Consequently, if the rolling motion during the left turning operation is decreased, so that the roll input magnitude (Rm) is decreased to be smaller than the control reference (Trg1), then the braking force control is terminated at the time (t12). In this case, in order to restrain the influence to the rolling motion affected by a rapid decrease of the braking force, the braking force may be so controlled to be decreased gradually, with decreasing speed of the braking force being limited, as indicated by a broken line in FIG. 11.

Next, in the case where the vehicle is turned to the other direction (second turning operation, right turn in FIG. 11), the control reference (Trg2) for the second turning operation is provided on the basis of the control reference (Trg1) for the first turning operation. For example, in case of a rapid rolling motion, the control reference (Trg2) is set to be smaller than the initially set reference (Reg2) for estimating the roll increasing tendency. Thus, in the case where the vehicle is shifted from the first turning operation to the second turning operation rapidly, the roll increasing tendency is estimated on the basis of the control reference (Trg2) which is smaller than the reference (Reg2), to perform the braking control and driving control. Therefore, the control is initiated with relatively small roll input magnitude (Rm), so that relatively large braking force will be applied to the wheel. As a result, the dynamic roll increasing tendency is accurately determined, to achieve the braking force control certainly.

In the case where the vehicle is shifted from the first turning operation to the second turning operation, the characteristic of the roll increasing tendency is unlikely to be changed. If the dynamic roll increasing tendency is observed during the first turning operation, it is observed during the second turning operation, too. Therefore, it is very advantageous for the roll increasing tendency restraining control that the control reference for the second turning operation is provided on the basis of the control reference for the first turning operation, and that the roll increasing tendency for the second turning operation is estimated on the basis of the control reference for the second turning operation. In the embodiments as described before, the control references for the first and second turning operations are provided on the basis of the roll input magnitude (Rm) and roll input velocity (dRm). However, the references for estimating the roll increasing tendency may be provided on the basis of variables including either one of the state variables (Ram, Rm) indicative of magnitude of the input of the rolling motion, and either one of the state variables (Rsp, dRm) indicative of velocity of the input of the rolling motion, and the control references for the first and second turning operations may be provided on the basis of either one of the state variables (Ram, Rm) indicative of magnitude of the input of the rolling motion, when the state variable indicative of the actual rolling motion crosses the references for estimating the roll increasing tendency in a direction to be increased.

In order to respond the dynamic roll increasing tendency, it is advantageous to employ the state variable obtained as early as possible. Therefore, it is desirable to use the state variable obtained on the basis of the steering angle (δsw) of the steering wheel SW, which is the first input of the rolling motion, out of the plurality of state variables as shown in FIG. 3. That is, the steering angular velocity (dδsw), or variation in time of the estimated lateral acceleration (dGy2) calculated from the steering angle (δsw) is appropriate for the roll input velocity (dRm). When estimating the roll increasing tendency of the vehicle, not only the early estimation but also certain estimation based on the road surface condition are required. Therefore, it is desirable for the roll input magnitude (Rm) to use the state variables reflecting the result from a road coefficient of friction (μ), which include the lateral acceleration (Gy), yaw velocity (Yr), or the state variable obtained thereby. These are the state variables indicative of the vehicle behavior in a lateral direction or yaw direction, which are resulted from the lateral force created on each wheel, as apparent from the fact that the state variables are classified in such a region as shown at the right side from lateral force in FIG. 3.

The lateral acceleration (Gy), yaw velocity (Yr), and the state variable provided thereby are the state variables, which are resulted from operation of the steering wheel SW, but which are obtained later in time than the state variables obtained on the basis of the steering angle (δsw) of the steering wheel SW. However, they reflect the road surface condition, to provide a certain and robust state variable, and they are effective for a relatively gradual vehicle behavior such as the static roll increasing tendency. Therefore, the state variables obtained by the vehicle behavior in the lateral direction or yaw direction, which reflects the result from the road coefficient of friction (μ), may be used for the roll input magnitude (Rm), to achieve a certain and robust estimation of the roll increasing tendency.

Accordingly, it is desirable in the flowchart as shown in FIG. 10 that the state variable (lateral acceleration (Gy), yaw velocity (Yr), or estimated lateral acceleration (Gy1) calculated on the basis of the yaw velocity), which are affected by the road coefficient of friction (μ), may be used for the roll input magnitude (Rm), and the state variable (steering angular velocity (dδsw), or variation in time of the estimated lateral acceleration (dGy2) calculated on the basis of the steering angle), which are obtained on the basis of the steering angle (δsw) of the steering wheel SW, may be used for the roll input velocity (dRm), in combination with the former state variable. As a result, the dynamic roll increasing tendency can be estimated appropriately by the state variable obtained on the basis of the steering angle (δsw), and the static roll increasing tendency can be estimated appropriately by the state variable obtained on the basis of the state variable affected by the road coefficient of friction (μ), respectively. Furthermore, the intermediate roll increasing tendency can be estimated appropriately by the state variable obtained on the basis of the two-dimensional relationship, with the roll input magnitude (Rm) and roll input velocity (dRm) being as variables. With the rolling motion stability control being performed on the basis of the roll input magnitude (Rm) affected by the road coefficient of friction (μ), the braking force control and driving force control can be continued or terminated, appropriately.

According to the embodiments as described above, two roll state variables have been employed to estimate the roll increasing tendency, and the rolling motion stability control is performed, with either one of the roll state variables used for estimating the roll increasing tendency, being employed as the control reference. However, the present invention is not limited to that embodiment, but may provide the apparatus for estimating the roll increasing tendency on the basis of the characteristic appropriate for estimating the roll increasing tendency, and performing the braking force control and driving force control on the basis of the characteristic appropriate for continuing the controls, which may be different from the former characteristic. Therefore, it may be so constituted to estimate the roll increasing tendency on the basis of the characteristic including at least one of the state variables as shown in FIG. 3, and perform the braking force control and driving force control on the basis of the state variable which was not used for estimating the roll increasing tendency. For example, the roll increasing tendency may be estimated on the basis of a relationship (characteristic) between the roll angle and roll velocity, and the rolling motion stability control may be performed, on the basis of the lateral acceleration obtained when the roll increasing tendency was estimated. Or, the roll increasing tendency may be estimated on the basis of the roll velocity, and the rolling motion stability control may be performed, on the basis of the lateral acceleration obtained when the roll increasing tendency was estimated.

Figure 12:
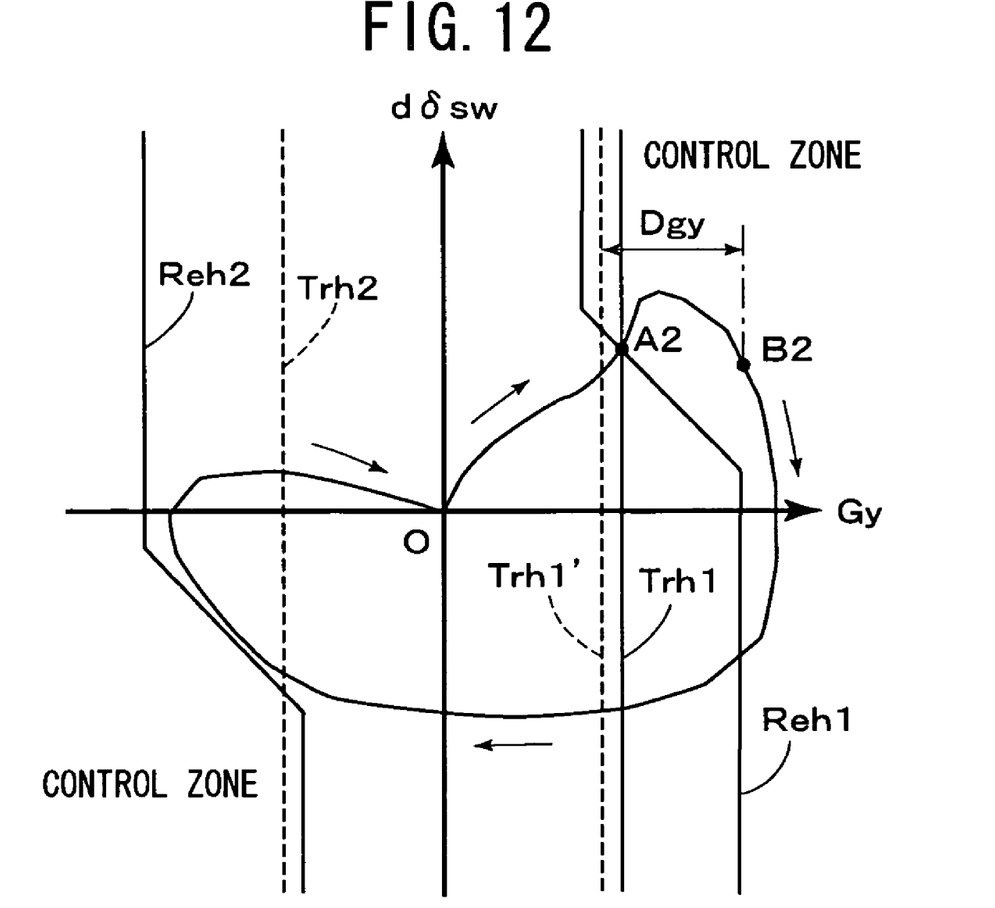
FIG. 12 is a diagram showing an example of operation using a control map according to a further embodiment of the present invention.

Furthermore, when the control references are provided, they may be modified by other state variables. FIG. 12 shows a map for use in estimating the roll increasing tendency, on the basis of the lateral acceleration (Gy) as the roll input magnitude, and the steering angular velocity (dδsw) as the roll input velocity. Hereinafter will be explained an operation performed in the case where the steering wheel SW was rapidly steered to be rotated further, during a cornering operation of the vehicle, as indicated by a region near a point (A2) in FIG. 12. According to the embodiment as described above, the lateral acceleration, which is obtained when the roll state variable crosses the reference (Reh1) for estimating the roll increasing tendency at the point (A2) in FIG. 12, in a direction to be increased, is used to provide the control reference (Trh1) for the first turning operation, as shown in FIG. 12. According to the present embodiment, with reference to other state variables obtained in that case, such as a variation in time (dGy) of the lateral acceleration, yaw acceleration (dYr), variation in time (dGy1 or dGy2) of the estimated lateral acceleration, the control reference (Trh1) is modified into a control reference (Trh1') as indicated by a broken line in FIG. 12. For example, when the variation in time (dGy) of the lateral acceleration is larger than a predetermined value, the control reference (Trh1) is modified to be reduced, to provide the control reference (Trh1'). And, the control reference (Trh2) for the second turning operation is provided to be symmetrical relative to the control reference (Trh1'), about the origin (0). Therefore, in the first turning operation, a state variable deviation (Dgy) between the actual roll state variable and the control reference is increased largely, to apply a relatively greater braking force to the wheels, so as to stabilize the rolling motion of the vehicle. As a result, even in the case where the roll increasing tendency is likely to be accelerated by the rapid steering operation by the vehicle driver to rotate the steering wheel further, the roll increasing tendency of the vehicle will be restrained certainly. In the second turning operation, the control reference (Trh2) for starting the control is modified to be of smaller characteristic, so that the roll increasing tendency of the vehicle will be restrained certainly, even in the transient steering operation shifted from the first turning operation to the second turning operation.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A rolling motion stability control apparatus for restraining a roll increasing tendency of a vehicle to stabilize a rolling motion thereof, comprising:
    wheel brake means for applying braking force to wheels of said vehicle;
    turning direction determination means for determining whether a turning direction of said vehicle is one direction or an other direction;
    state variable acquiring means for acquiring a state variable indicative of a rolling motion of said vehicle;
    first braking force control means for starting to apply a first braking force to at least one of said wheels through said wheel brake means, when said turning direction determination means determines that said vehicle is turned to the one direction of said vehicle and the roll state variable acquired by said state variable acquiring means exceeds a reference for starting control of said first braking force control means;
    second braking force control means for starting to apply a second braking force to at least one of said wheels through said wheel brake means, when said turning direction determination means determines that said vehicle is turned to the other direction of said vehicle and the roll state variable acquired by said state variable acquiring means exceeds a reference for starting control of said second braking force control means; and
    reference setting means for setting a first predetermined value as the reference for starting control of said first braking force control means and for setting a second predetermined value as the reference for starting control of the second braking force control means, and modifying the reference for starting the control of said second braking force control means to be smaller than the second predetermined value, when said turning direction determination means determines that said vehicle is turned to the one direction of said vehicle;
    wherein the one direction is one of a left direction and a right direction, and the other direction is the other of the left direction and the right direction.

2. A rolling motion stability control apparatus as set forth in claim 1, wherein said turning direction determination means determines the turning direction of said vehicle on the basis of at least one of lateral acceleration, yaw velocity and steering angle of said vehicle.

3. A rolling motion stability control apparatus for restraining a roll increasing tendency of a vehicle to stabilize a rolling motion thereof, comprising:
    wheel brake means for applying braking force to wheels of said vehicle;
    turning direction determination means for determining whether a turning direction of said vehicle is one direction or an other direction;
    state variable acquiring means for acquiring a state variable indicative of a rolling motion of said vehicle;
    first braking force control means for starting to apply a first braking force to at least one of said wheels through said wheel brake means, when said turning direction determination means determines that said vehicle is turned to the one direction of said vehicle and the roll state variable acquired by said state variable acquiring means exceeds a reference for starting control of said first braking force control means;
    second braking force control means for starting to apply a second braking force to at least one of said wheels through said wheel brake means, when said turning direction determination means determines that said vehicle is turned to the other direction of said vehicle and the roll state variable acquired by said state variable acquiring means exceeds a reference for starting control of said second braking force control means; and
    reference setting means for setting the reference for starting control of said first braking force control means and the reference for starting control of said second braking force control means, respectively, wherein said reference setting means sets the reference for starting the control of said second braking force control means on the basis of the roll state variable acquired by said state variable acquiring means when the roll state variable exceeds the reference for starting the control of said first braking force control means, in the case where said turning direction determination means determines that said vehicle is turned to the one direction of said vehicles;
    wherein the one direction is one of a left direction and a right direction, and the other direction is the other of the left direction and the right direction.

4. A rolling motion stability control apparatus as set forth in claim 3, wherein said turning direction determination means determines the turning direction of said vehicle on the basis of at least one of lateral acceleration, yaw velocity and steering angle of said vehicle.

5. A rolling motion stability control apparatus as set forth in claim 3, wherein the control of said second braking force control means is performed on the basis of a control reference corresponding to the reference set for starting the control of said second braking force control means.

6. A rolling motion stability control apparatus as set forth in claim 3, wherein the reference for starting the control of said first braking force control means is set on the basis of a roll input magnitude and a roll input velocity, and wherein the reference for starting the control of said second braking force control means is set on the basis of the roll input magnitude acquired when the roll state variable exceeds the reference for starting the control of said first braking force control means.

7. A rolling motion stability control apparatus as set forth in claim 6, wherein the control of said second braking force control means is performed on the basis of a control reference corresponding to the reference set for starting the control of said second braking force control means.

* * * * *